March 17, 1953     I. E. MUSKAT     2,631,955
PRODUCTION OF RESIN BONDED FIBROUS ARTICLES
Filed March 16, 1944     2 SHEETS—SHEET 1

INVENTOR.
IRVING E. MUSKAT
BY *Irving E. Muskat*

March 17, 1953     I. E. MUSKAT     2,631,955
PRODUCTION OF RESIN BONDED FIBROUS ARTICLES
Filed March 16, 1944     2 SHEETS—SHEET 2

INVENTOR.
IRVING E. MUSKAT
BY Irving E. Muskat

Patented Mar. 17, 1953

2,631,955

UNITED STATES PATENT OFFICE 2,631,955

PRODUCTION OF RESIN BONDED FIBROUS ARTICLES

Irving E. Muskat, Plainfield, N. J., assignor to Marco Chemicals, Inc., a corporation of New Jersey Application March 16, 1944, Serial No. 526,776

16 Claims. (Cl. 154—75)

1

This invention relates to a method of preparing fibre reenforced resinous parts. It is known to form laminated fabric sheets or other elements by impregnating a plurality of assembled sheets with resin and curing the assemblage in a press under high pressure. Such a process is often objectionable because of the expensive equipment required and further because only products of limited size may be produced due to the high pressure which must be developed.

More recently certain laminated resinous parts have been formed without pressure by inserting a stack of impregnated sheets between a pair of glass sheets and curing the assemblage. In such a case the products obtained often are irregularly impregnated and contain insufficient or excessive amounts of resin and exhibit unsightly blemishes, drain marks, blisters and similar defects which weaken the laminate or otherwise impair its use. Furthermore the breakage of glass in the process is often so serious as to make the process unfeasible from a commercial standpoint.

Use of metal plates in lieu of the glass in such a process has not proven satisfactory due to the greater weight of such parts and the greater tendency to produce defective products, since the metal plates are opaque and the formation of defects cannot be readily detected.

The problem is particularly acute when fabric parts of a curved or similarly shaped cross section are produced by this method, since mating molds used must fit accurately and often slight inaccuracies in the shape of the molds will cause production of products which are defective due to drainage, wrinkles, blister formation, etc.

In order to avoid the expense of accurately machined pairs of mating molds, shaped resin laminates have been prepared by laying an impregnated fibrous sheet or stack of sheets upon a mold of desired shape or contour, enclosing the mold and the fibrous sheets in a rubber bag and evacuating the bag. This process requires the use of a specially prepared bag of substantial weight in order to withstand the differential pressure, established by the evacuation and the bags can be used only a limited number of times before breaking down under the curing temperature. Furthermore the bags are heavy and generally must be constructed to special shape for each type of part. Consequently, the process is objectionably expensive. In addition, the production of articles which are uniformly impregnated and control of resin content is difficult.

In accordance with the present invention many

2 of these difficulties may be avoided or substantially minimized and a well-bonded product of uniform and controlled resin content obtained. In accordance with this process a sheet or plurality of superposed sheets may be impregnated with a liquid polymerizable material, preferably a viscous adhesive or tacky liquid, and placed in a nonporous envelope of light flexible construction, preferably made of a transparent material or an envelope at least one side of which is made of a light flexible material such as cellophane. The flexible wall of the envelope is then forced or squeezed against the impregnated fabric base squeezing out the excess polymerizable liquid which in turn sweeps out entrapped air in a direction laterally with respect to the wall of the cellophane or similar material to a region adjacent the edges of the fabric. Preferably the squeezing or compacting is effected by rolling or application of other squeezing pressure which moves from an interior portion of the impregnated base toward an edge thereof whereby the excess polymerizable liquid and entrapped air is positively forced to the edge of the fabric. By means of this squeezing pressure the flexible sheet or envelope is forced into intimate contact with the fibrous base and by control of the degree of pressure applied it is possible to control the resin content of the ultimate product. The sheet thus compacted adheres closely to the flexible cover, the cover being at least partially held in place by atmospheric pressure and partially by the adhesion of the impregnated base to the cover. Consequently, after the removal of the air and excess polymerizable liquid the envelope is effectively held against the impregnated fabric and the compacting and squeezing pressure may be released completely or reduced substantially to a pressure sufficient to hold the layers of laminate in place. Moreover, the polymerizable liquid thus forced to the edges effectively seals the assemblage against reentry of air into a central portion of the fibrous base.

The assemblage is then polymerized while the seal is maintained at least until a solid polymer has been secured. The process is particularly effective when a polymerizable liquid which is comparatively viscous and adhesive is used since the liquid more effectively seals at the edges preventing or minimizing subsequent inclusion of air in the fibrous base during curing.

The invention may be more fully understood by reference to the accompanying drawing in which.

Figure 3:
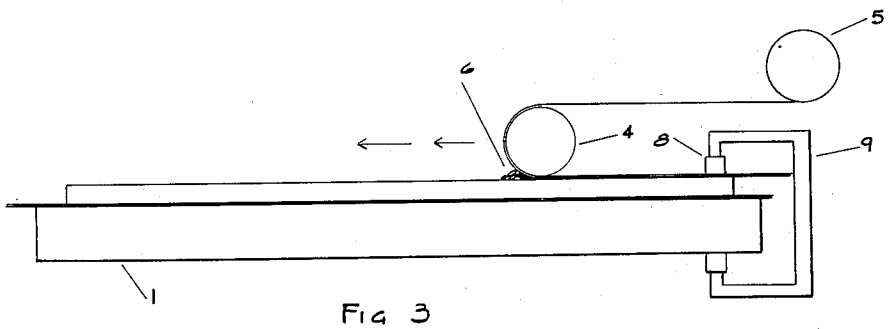

Fig. 3 diagrammatically illustrates apparatus for carrying out a modified embodiment of the process.

Figure 4:
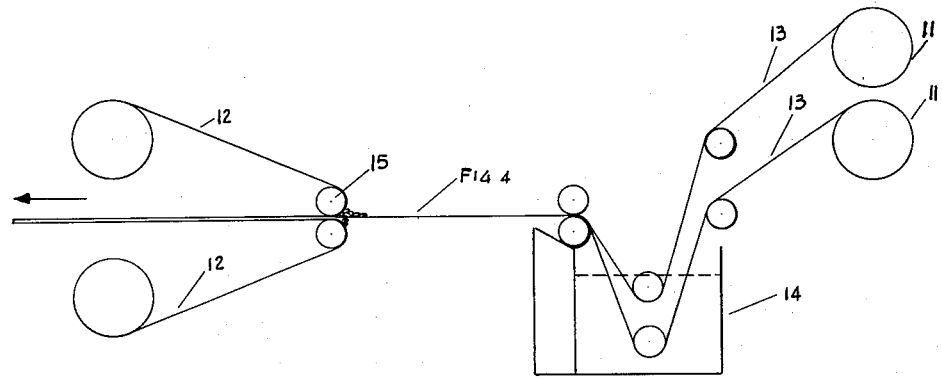
Figure 5:
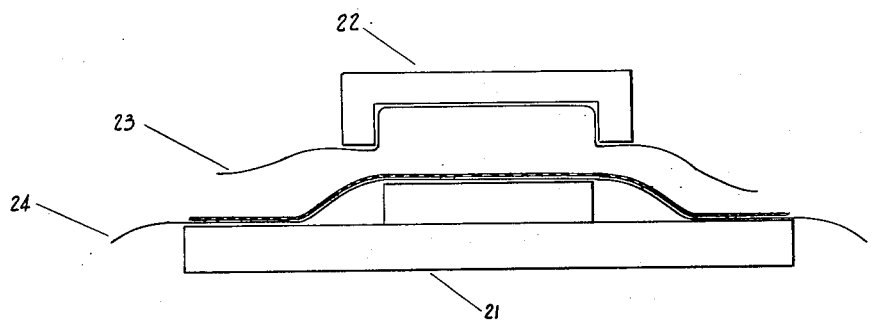
Figure 6:
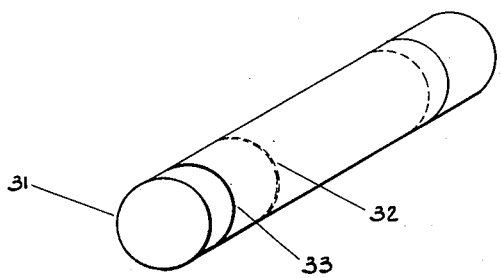

Fig. 4 is a diagrammatic illustration of apparatus which may be used for performing the method of the invention in a continuous manner and Figs. 5 and 6 illustrate the production of shaped resinous parts.

In accordance with one suitable modification, the envelope may be made in the form of a bag or receptacle enclosing the entire mold as shown in Fig. 6. This process is effective where the impregnated fibrous base 32 is wrapped upon a mold such as a tubular mandrel 31 and where it is desired to form a product of cylindrical or similar cross section. In such a case a cylindrical envelope 33 may be formed and slid over the impregnated fibrous base resting upon the mold or a sheet of the flexible nonporous material may be wrapped around the mold and overlapped, whereby upon application of the squeezing or compacting pressure excess monomer or polymerizable liquid is squeezed from the impregnated sheet and forced to the edges and also between the overlap and the intermediate film of polymerizable liquid so formed adjacent the edges, and the lap joint of the cover effectively seals the assemblage and prevents drainage of the liquid from the fibrous base or inclusion of air therein.

Figure 1:
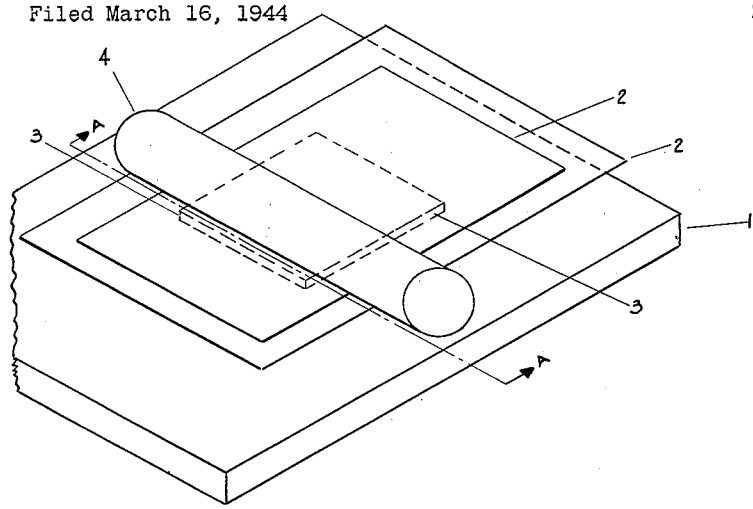
Fig. 1 is a diagrammatic view of apparatus which may be used for preparing flat sheets by the method of the present invention.

In the production of many types of resin parts the laminate may be enclosed in a nonporous or impermeable envelope without enclosure of the molds therewith. This constitutes a process which is quite different from the prior art methods of using enclosing envelopes. Sheets or strands may be enclosed in accordance with this method and effectively cured. The process is especially valuable since it affords a means of avoiding the construction of specially prepared envelopes and permits operation with but one mold or even without molds altogether. Thus an impregnated fibrous sheet or laminate may be placed between a pair of cover sheets of a nonporous material such as cellophane or polyvinyl alcohol and rolled out or otherwise squeezed or compacted to press the cover sheets into close contact with the fibrous base, and expel excess polymerizable liquid and entrapped air. In accordance with one effective method, illustrated in Fig. 1, a fibrous base 3 may be placed upon a sheet of cellophane or similar material 2 resting upon a suitable base 1 and impregnated with an excess of polymerizable liquid. Thereupon a second sheet of cellophane 2 may be laid upon the impregnated base and the assemblage compacted by rolling a roller 4 from an edge of the assemblage or a central portion thereof toward another edge. By this means entrapped air is swept from the impregnated base by the excess polymerizable liquid which is squeezed out ahead of the roller. Furthermore the cellophane cover sheets are forced into intimate and closely adherent contact with the impregnated base so that after the roller and the compacting pressure is released the cellophane is held in place.

Figure 2:
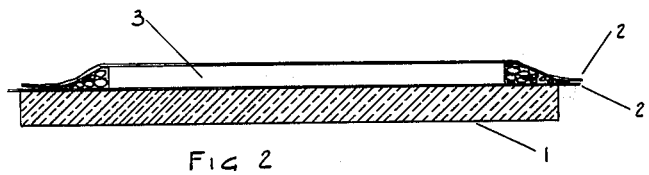
Fig. 2 is a cross sectional view taken along line A—A of Fig. 1.

Preferably the cover sheets should be larger than the impregnated fibrous base and should overlap at the edges. In such a case the polymerizable liquid is squeezed toward the edges of the cover sheets coating them and causing them to adhere to each other thereby forming a seal preventing air from entering from the side of the impregnated fibrous sheet after rolling as shown in Fig. 2. Occasionally, particularly where the polymerizable liquid is comparatively viscous and adhesive, the process is conducted using cover sheets which do not overlap at the edges so that while the laminate is essentially enclosed, the edges may be exposed to the atmosphere. In such a case sealing of the edges may be somewhat less effective and accordingly the edges of the laminate may be defective. Such defects if formed may be trimmed off and a central portion which is free from defects obtained.

Often it is desirable to conduct the process by simultaneously applying the cellophane and squeezing the fibrous base. Thus a fibrous laminate impregnated with a liquid polymerizable material may be laid upon a cover sheet of cellophane as shown in Fig. 3 of the drawing and the second sheet of cellophane, drawn from a roll 5, applied to the upper surface of the laminate by rolling. This is done by applying one end of the cellophane to one end of the laminate and holding it there, as by the metal strips 8 and clamps 9, then applying a roller 4 to the cellophane sheet above the point of contact of the sheet to the laminate and rolling the roller toward the opposite end of the laminate while keeping the cellophane sheet taut in order to minimize wrinkles. By this method excess monomer is continually rolled out of the sheet and flows before the roller as it passes across the sheet. This monomer 6 flowing before the roller, sweeps air from under the cellophane sheet preventing air entrapment and effectively sealing the cover sheet to the laminate. In accordance with a further modification other means may be utilized to squeeze the base. For example, air and excess monomer may be swept out from under the cellophane by impinging a jet of air against the sheet as it rests upon a base to compress the sheet at a localized portion thereof. This jet may be gradually moved toward an edge to force out the air and polymerizable liquid.

If desired, the process may be conducted in a continuous manner. In such a case the fibrous base in the form of a continuous web or a plurality of continuous sheets 13, drawn from the rolls 11, may be impregnated by passing the sheets through tank 14 containing a polymerizable liquid and following impregnation, the sheets may be superposed. This laminate may be passed through rollers 15 which simultaneously squeeze out excess polymerizable liquid and entrapped air and apply cellophane cover sheets 12 to the laminate sealing the cover sheets to the surface of the laminate. When the sheets overlap the laminate, it is thereby enclosed in an essentially air tight envelope as previously described. As indicated in Fig. 4, the squeezing action of the rolls causes an accumulation of a body of polymerizable liquid in front of and in contact with the roll thus forming a seal in front of the roll and preventing or minimizing air entrapment. This process is particularly effective where a polymerizable liquid of high viscosity is used since in such a case it is possible to maintain this sealing pool in contact with the under roll and the underside of the sheet.

The continuous sheet thus secured may be cured by continuous passage through a heating oven and in such a case laminates which are especially strong may be obtained from woven fabrics since the fabrics are under tension while curing. If desired, however, the sheets may be sliced into lengths after application of the cover sheets and the sheets laid upon a metal, wood or other base or mounted in a frame and cured in the usual manner.

The application of pressure to the cellophane covered sheet as herein described in order to force out an excess of polymerizable liquid is especially valuable since it affords a simple means of controlling the thickness and resin content of the ultimate laminate. Generally, sufficient pressure is applied to reduce the resin content to below 75% and preferably below 60% by weight of the ultimate laminate.

In order to secure superior products it is often found advantageous to clamp the cellophane or other cover sheets together at the edges of the sheet. Thus it is occasionally noted that during curing the cellophane shrinks and wrinkles and/or air leakage may result. This difficulty, if it arises, may be avoided by clamping the cellophane and/or the fabric covered by the cellophane together and holding the assemblage tightly so as to minimize shrinkage and/or leakage. This may be done by laying flat metal strips 8 of substantial rigidity upon the cellophane or upon the edges of the covered fabric and clamping the strips to the base by suitable means such as clamps 9, as shown in Fig. 3.

The strips may be applied to the entire periphery of the laminate and held in place during curing or at least until the polymerizable liquid in the fibrous base has gelled. By this means the cellophane is held extended and consequently if shrinkage of the cellophane occurs the cellophane is merely tightened and maintained under some tension, thereby wrinkling or leakage is prevented or at least minimized.

This process is particularly adapted to use in connection with the continuous impregnating and enclosing process illustrated in Fig. 4. For example, when it is desired to cure the impregnated sheet in a batch process the sheet is cut into lengths after formation and these lengths laid upon a suitable base for curing. Often when these sheets are sliced air leakage occurs at the point of severance spoiling the seal. The problem is particularly objectionable when the cellophane cover sheet is under some tension since slicing in such a case may cause slippage of the cover and thus produce wrinkles and destroy the seal. This difficulty may be avoided by simply clamping the sheet between strips of metal or other rigid material extending the full distance across the sheet and located on both sides of the point of severance. In this manner the cover sheet is held tightly against the impregnated base.

The clamps or other equivalent devices may be applied to the ends and sides of the sheet, if desired. However, clamping along the sides may not be essential particularly where the cover sheets overlap as illustrated in Fig. 2.

Occasionally, particularly where a polymerizable liquid of low viscosity is used, it may be desirable to apply a light weight such as a glass or a metal plate to the sheets in order to ensure production of a compact laminate and prevent wrinkling during curing. Where this expedient is resorted to, weights capable of establishing a pressure of 1 to 5 pounds per square inch are sufficient. Generally this pressure is substantially below that applied to squeeze out the excess polymerizable liquid as described above.

The present process permits the formation of a wide variety of fibrous parts in various shapes and contours from the product thus enclosed and sealed. For example, if a flat sheet is desired, the laminate may be cured while holding the laminate flat. On the other hand products of arcuate cross section or of other curvature may be prepared simply by holding the assemblage in the desired shape during curing. Thus, the covered impregnated fibrous base may be laid upon a tubular mandrel to form a tubular segment, or upon a channel or angle iron to form a channel or angle section. The process is especially advantageous since it eliminates the requirement of a pair of complementary molds, or a vacuum bag hitherto regarded as essential and permits fabrication, in a simple and economical manner of many shaped parts using only a single mold which may be either a male or a female mold depending upon the type of part required.

The invention may be subjected to use in connection with other shaping processes involving use of male and female molds as shown in Fig. 5. In such a case an impregnated sheet may be placed between two nonporous sheets 23, 24 and the sandwich clamped between a pair of complementary molds 21 and 22. Excess monomer is squeezed out from between the cellophane sheets and a seal formed as previously described. Thereupon the shaped part is cured in the usual manner.

While the process is particularly advantageously conducted using two flexible cover sheets to form the nonporous envelope, certain parts may be formed using other types of envelopes. For example, a suitable envelope for many purposes may be formed by use of a single flexible sheet. In such a case the laminate may be laid upon a flat or curved rigid base as an aluminum or a glass plate and the cellophane cover sheet applied as described above to form a flexible envelope. Furthermore, a bag may be made and the laminate placed within the bag and rolled out as described. Numerous other modifications will occur to those skilled in the art.

While the invention has been described with particular reference to the use of cellophane as a cover sheet, it is not limited to this material since other flexible nonrigid sheets which are essentially nonporous or impermeable to the polymerizable liquid and/or to air and which are not dissolved by the polymerizing liquid may be used. For most cases, such sheets preferably should be capable of being wetted by the polymerizable liquid. In general, nonporous films or foils having a thickness below about 0.05 inch and made from transparent cellophane or polyvinyl alcohol foils or films, rubber, metal foil or thin sheet, etc., are found suitable. Such materials are normally nonadherent to the polymerizable liquid and may be removed readily after the resin impregnated sheets are cured. Cellulose acetate or nitrate sheets or foils may be suitable in some cases but very often such foils adhere too readily to the polymerizable compound.

The process may be used to produce resinous parts from various types of fibrous materials such as sheets of cotton or wool fabrics, canvas, duck, muslin, linen, rayon or nylon fabrics, woven or felted glass fiber or glass or mineral wool, asbestos, or cotton batting, etc. The process is especially effective in producing laminated products comprising a plurality of layers of the above materials. However, individual sheets of felted or woven fibrous material may be impregnated and polymerized as herein contemplated.

As stated above, the process is particularly effective when a comparatively viscous, adhesive or tacky polymerizable liquid is used, since in such a case it is possible to obtain more effective sealing of the cover sheets to the fibrous base and to reduce the resin content of the sheet substantially by squeezing more resin therefrom. Moreover, use of a comparatively viscous adhesive composition effectively decreases the tendency for air to be drawn into the fibrous base during curing. Generally it is found that many of the more viscous polymerizable liquids are also more adhesive in character and consequently this adhesive property of the polymerizable liquid materially aids in preventing formation of defects during curing inasmuch as the cover sheets are held tightly to the base and the assemblage is effectively sealed against leakage or drainage. Liquids having a viscosity of at least 500 and preferably in excess of 1000 centipoises at room temperature may be used most effectively. While it is of course obvious that liquids which are so viscous that they have little ability to flow would not readily penetrate a fibrous base and may be unsatisfactory, it is generally found that liquids which flow sufficiently to penetrate a fibrous base at the temperature of operation are not too viscous for use in accordance with the invention.

Viscous polymerizable liquids which are adhesive in character are particularly advantageous. Thus a liquid which is tacky and which adheres to a surface with sufficient tenacity to string out when pulled away from the surface are much more effective than are more oily polymerizable liquids which do not exhibit this tendency to string out.

Particularly useful polymerizable liquids for this purpose are the esters of unsaturated dibasic acids such as maleic, fumaric, itaconic, or citraconic acids, or acetylene dicarboxylic acid and a polyhydric alcohol such as ethylene glycol, propylene glycol, isobutylene glycol, 1,3 trimethylene glycol, hexamethylene glycol, glycerol, methyl glycerol, pinacol, phthalyl alcohol, or polyhydroxy polymers of these alcohols containing up to 4 polyhydric alcohol units such as diethylene glycol, triethylene glycol, tetraethylene glycol, dipropylene glycol, polyglycerol, etc. These esters are comparatively high in molecular weight, contain at least two units of the dibasic acid and the polyhydric alcohol and are very adhesive. Such esters may include the alkyds such as ethylene glycol maleate, ethylene glycol fumarate and ethylene glycol itaconate formed by reaction of ethylene glycol with fumaric or similar acid to an advanced stage of esterification, for example to an acid member of 50 or below. They may also include mixed esters in which monohydric alcohols (methyl, ethyl, propyl or tetrahydrofurfuryl alcohol) and/or monobasic acids (acetic, propionic, oleic, stearic acids, etc.) are incorporated in the reaction mixture. In addition, they may include the polyhydric alcohol— unsaturated polycarboxylic acid esters formed by reaction of glycol maleate, diethylene glycol fumarate or similar ester having an acid number of 150 or below with a monohydric alcohol such as methyl, benzyl, ethyl or propyl alcohol. Such esters and the preparation thereof are described in copending application for Letters Patent, Serial No. 520,319, filed by Charles Gould, January 29, 1944, now Patent No. 2,418,633.

Often these polyhydric alcohol esters are found to be unduly viscous and accordingly impregnation of fibrous bases with such esters is very difficult. In many cases it is found advantageous to blend such esters with less viscous polymerizable liquids including methyl methacrylate, styrene, vinyl acetate, ethyl itaconate, methyl alpha chloroacrylate, diallyl esters including allyl carbonate, allyl phthalate, allyl maleate, allyl fumarate, allyl succinate, allyl adipate, or other corresponding polymerizable unsaturated alcohol poly ester or other compounds including divinyl benzene, glycol dimethacrylate, allyl methacrylate, allyl crotonate, etc. The amount of such diluting polymerizable liquid will be dependent upon the actual viscosity of the glycol esters used and should not be in such excess that the resulting mixture has a viscosity below 1000 centipoises. Usually the viscosity of the mixture will be 1500–3000 centipoises and the mixture will contain less than 25% by weight of the diluting liquid.

While the invention is particularly adapted to use in connection with polymerizable unsaturated esters of a polyhydric alcohol and an unsaturated dibasic acid, it may also be applied to use in connection with less viscous materials although the problem of securing proper sealing may be somewhat more difficult. For example, the process may be applied to the following classes of polymerizable materials.

1. Polymerizable unsaturated alcohol esters of unsaturated acids such as the esters of vinyl, allyl, methallyl, crotyl, beta ethyl allyl, propargyl, methyl propargyl, oleyl, linoleyl, ricinoleyl, linallyl, phenyl propargyl or cinnamyl alcohol and unsaturated acids such as acrylic, methacrylic, alpha or beta chloracrylic, crotonic or cinnamic acids including allyl acrylate, allyl alpha chloracrylate, etc.

2. Polymerizable unsaturated alcohol polyesters of polybasic acids such as phthalic, carbonic, oxalic, succinic, adipic, azelzic, sebacic and terephthalic acids including diallyl carbonate, diallyl maleate, diallyl fumarate, diallyl oxalate, diallyl adipate, diallyl itaconate, diallyl succinate, ethylene glycol bis (allyl carbonate) diethylene glycol bis (allyl carbonate) and mixtures thereof.

3. Polyhydric alcohol esters of the above unsaturated acids and polyhydric alcohols such as ethylene glycol, diethylene glycol, propylene glycol, dipropylene glycol, triethylene glycol, hexaethylene glycol, glycerol, sorbitol, mannitol, ethylene glycol dimethacrylate, ethylene glycol diacrylate, etc.

4. Polymerizable ethers including divinyl ether, etc. and copolymers of the ethers and any of the above compounds.

5. Other organic compounds containing two or more unsaturated unconjugated groups including divinyl benzene, divinyl naphthalene vinyl acetylene, divinyl acetylene, etc.

In addition, the process may be applied to the treatment of other unsaturated compounds containing but a single unsaturated group such as vinyl acetate, methyl acrylate, acrylonitrile, methyl methacrylate, ethyl methacrylate, butyl methacrylate, styrene, vinyl chloride, vinylidine chloride, methyl itaconate, methyl fumarate, methyl alpha chloracrylate, etc. or to copolymers thereof with the above polyfunctional materials.

Other liquid polymerizable or condensible materials capable of curing to a thermosetting state including glycerol phthalate, a liquid phenol aldehyde resin, melamine aldehyde condensation products, urea condensation products or mixtures of these materials with the above compounds containing two or more polymerizable groups may also be used in accordance with the present invention.

In accordance with a further modification of the invention, the fibrous sheets enclosed or partially enclosed in a flexible envelope as herein described may be partially polymerized to a semisolid polymer or to a polymerizable gel. Thus a sheet formed and enclosed between cellophane sheets as indicated in Fig. 4 may be partially polymerized to convert the polymerizable liquid to a gel or to a semisolid polymer having little or no ability to flow. This sheet may be stored for a long period of time and may be used at any convenient time to produce resinous parts. Thus these partially cured sheets may be shaped or bent to any desired contour such as an angle, channel, cylindrical or spherical segment by laying the partially polymerized sheet upon a mold or clamping the sheet between a pair of mating molds and polymerizing the sheet.

The production of these partially polymerized sheets may be accomplished by heating the sheets for but a portion of the time required to effect completion. The temperature used should be sufficiently high to cause polymerization but sufficiently low to ensure the presence of sufficient peroxide catalyst to be capable of catalyzing complete or substantially complete polymerization. Often the polymer should contain up to 0.01% by weight (based upon the weight of polymerizable material in the fibrous base) of a polymerization inhibitor such as hydroquinone, copper resinate, cuprous chloride, etc.

In many cases liquid polymerizable liquids which are not sufficiently viscous may be treated to increase their viscosity by partial polymerization to thicken the liquid. Thus it is found desirable to partially polymerize most low viscosity diallyl esters such as diallyl phthalate, diallyl maleate, fumarate, etc. to at least 10 times the viscosity of the monomeric material. Likewise products having a viscosity equal to that of diallyl phthalate thickened at least 10 or more times the viscosity of monomeric diallyl phthalate are suitable for use in this invention, although such products are not as suitable as the glycol maleate esters or blends containing such esters as previously described.

The following examples are illustrative:

Example 1

Diallyl phthalate containing 5% by weight of benzoyl peroxide was heated at 80° C. in a flask equipped with a stirrer and a 1 mm. glass tube provided with two spaced marks. At the beginning of the heating period and periodically thereafter, the diallyl phthalate was drawn up into the tube and allowed to flow back, the time required for the liquid to flow between the two marks being observed with a stop watch. When the time increased to 15 times the initial time the syrup obtained was cooled to room temperature.

A stack of ten layers of muslin cloth was centrally laid upon a sheet of cellophane resting on a rigid base, whereby the cellophane extended outwardly from the edges of the cloth. Three parts by weight of the thickened diallyl phthalate per part by weight of cloth was poured upon the cloth and distributed between the layers, whereby impregnation was substantially uniform. A cellophane cover sheet was laid upon the impregnated laminate so that the cellophane sheet covered the laminate and the edges of the cellophane overlapped in cloth laminate. A roller was placed in the middle of the assemblage and excess monomer forced out to the edges, the assemblage being compacted and rolled until the resin content of the fabric was about 60% by weight based upon the weight of the impregnated cloth. Entrapped air was thereby forced out of the laminate and the excess polymerizable syrup forced between the overlapping edges of the cellophane the assemblage being sealed thereby against reentry of air.

The enclosed laminate was placed in an oven and cured according to the following cycle:

½ hr. at 174° F.
½ hr. at 180° F.
½ hr. at 185° F.
½ hr. at 190° F.
½ hr. at 200° F.
15 minutes at 207° F.
15 minutes at 215° F.
15 minutes at 225° F.
15 minutes at 240° F.
15 minutes at 245° F.
15 minutes at 250° F.

The cellophane was removed and a well-bonded flat laminate was obtained. Where a shaped laminate is desired the enclosed laminate obtained as in this example may be laid upon a mold having desired contour (cylindrical segment, angle channel section, etc.) and the laminate cured while the laminate and its envelope is bent to the desired contour. Moreover the process may be used with monomeric diallyl phthalate although some drainage along the edges may tend to occur.

Example 2

20 moles of maleic anhydride, 2 moles of phthalic anhydride, 22 moles of ethylene glycol, and 0.1 percent by weight of hydroquinone based upon the weight of the mixture, were placed in a round bottomed flask equipped with a mercury sealed stirrer, gas inlet and a 6-inch column attached to a Liebig condenser. The system was gas tight. The mixture was heated to 188° C. and heating was continued for a period of 6 hours during which time the temperature rose to 200° C. and water was distilled off. Carbon dioxide was bubbled through the reaction mixture establishing a substantially inert atmosphere within the flask. The product thus obtained had an acid number of about 115.

332 grams of normal propanol was added to the flask and the flask was attached to a reflux condenser which condensed all of the vapors evolved and returned them to the flask. The mixture was refluxed at reflux temperature for 6 hours at a temperature gradually rising from 126 to 169° C. During this heating the mixture was agitated and carbon dioxide bubbled through to establish an essentially inert atmosphere.

The product, which had an acid number of about 90, was then topped at a temperature of 185–200° C. for 7 hours at a pressure of 2 to 4 mm. of mercury. The topped material was fairly fluid amber colored liquid less viscous than the glycol maleate ester from which it was prepared and had an acid number of about 35. Upon standing at room temperature a portion of the product crystallized to a white solid dispersed in the liquid. The amount of alcohol introduced was substantially in excess of that accountable for by reduction in acid number during propylation. The product obtained was mixed with 30% by weight of diallyl phthalate and 3% by weight of benzoyl peroxide and a mixture having a viscosity at room temperature of about 1000 centipoises was obtained. Five layers of duck were impregnated with the mixture, assembled to form a laminate, and covered with cellophane as in Example 1. The covered laminate was placed between aluminum plates and heated for 8 minutes at 85° C. The assembly was allowed to cool between the plates and upon cooling a flexible sheet containing a tacky polymer was obtained. Sheets thus prepared and enclosed between the cellophane sheets were removed from the plates and draped around a cylindrical mandrel. The shaped laminate was then placed in an oven and heated for two hours at 115° C. A hard well-bonded laminate was secured.

*Example 3*

20 moles of fumaric acid and 2 moles of phthalic anhydride and 22 moles of ethylene glycol were placed in a round bottomed flask equipped with a mercury sealed stirrer, gas inlet and a 6-inch column attached to a Liebig condenser. The system was gas tight. The mixture was heated to 188° C. and heating was continued for a period of 6 hours during which time the temperature rose to 200° C. and approximately 35 moles of water were distilled off. Carbon dioxide was bubbled through the reaction mixture establishing a substantially inert atmosphere within the flask. The product thus secured had an acid number of about 115.

332 grams of normal propanol was added to the flask and the flask was attached to a reflux condenser which condensed all of the vapors evolved and returned them to the flask. The mixture was refluxed at reflux temperature for 6 hours at a temperature gradually rising from 126 to 169° C. During this heating the mixture was agitated and carbon dioxide bubbled through to establish an essentially inert atmosphere.

The product, which had an acid number of about 90, was then topped at a temperature of 185° C. for 5 hours at a pressure of 2 to 4 mm. of mercury. The topped material was a fairly fluid amber colored liquid less viscous than the glycol fumarate ester from which it was prepared and had an acid number of about 35. This product was diluted with 20% by weight of vinyl acetate and 1% benzoyl peroxide dissolved in the mixture. A "Fiberglas" cloth laminate was prepared and cured according to the method of Example 1, sufficient pressure being applied during the rolling and compacting operation to reduce the resin content of the laminate to 45% by weight.

*Example 4*

2120 grams of diethylene glycol and 1960 grams of maleic anhydride were placed in a flask and heated as in Example 2 at a temperature gradually rising from 172° C. to 184° C. over a period of 3 hours. This product was a very viscous liquid which had an acid number of 80.

3862 grams of this product and 488 grams of normal propanol were heated under a reflux condenser as in Example 2 and at reflux temperature for a period of 14 hours. The product was topped at 200° C. and a pressure of 1 mm. of mercury. The resulting product was a fairly fluid liquid having an acid number of 25. Laminates prepared from this product blended with 10–20% by weight of styrene polymerized to form a polymer somewhat softer and less water resistant than the product obtained from ethylene glycol maleate of the corresponding acid number.

Harder polymers are obtained if fumaric acid is used in lieu of maleic anhydride.

*Example 5*

3850 grams of diethylene glycol maleate formed as in Example 4 and having an acid number of 95 was placed in a flask with 434 grams of normal propyl alcohol, 750 cc. of ethylene dichloride and 25 grams of glacial acetic acid. The flask containing the mixture was attached to a reflux condenser provided with a trap for collecting the condensate, separating evolved water and returning ethylene dichloride to the flask. The mixture was heated at a temperature gradually rising from 103° C. to 145° C. over a period of 28 hours. 60 cc. of normal propanol was then added and heating continued at reflux temperature for 20 hours. The product was then topped under a pressure of 1 mm. of mercury and a temperature of about 100° C. The resulting ester, which had an acid number of 30, was a viscous liquid somewhat less viscous than the glycol maleate from which it was made, but more viscous than the products prepared without solvent. This product may be used to form laminates as in Example 4 when blended with 10–20% by weight of vinyl acetate.

*Example 6*

The process of Example 5 was repeated, using methanol in lieu of propanol, and a liquid product which polymerized to a somewhat harder polymer was obtained.

*Example 7*

The process of Example 2 was repeated using 33 grams of 95% ethyl alcohol. Refluxing was continued for 20 hours. The product obtained was similar in character to the product of Example 2. Similar results may be secured using equivalent amounts of isobutanol. Normal butanol produces a somewhat softer polymer. When methanol is used in lieu of propanol a somewhat longer period of reflux is required. All of the polymerizable liquids obtained are less viscous than the glycol maleate subjected to treatment.

*Example 8*

Ethylene glycol maleate (formed by heating ethylene glycol with maleic anhydride until an alkyd resin having an acid number of about 10 was obtained) was diluted with sufficient vinyl acetate to reduce the viscosity of the mixture to about 1200 centipoises and 1% by weight of finely divided benzoyl peroxide was dissolved in the mixture. A cloth laminate was prepared and cured from this mixture using the method described in Example 1. This product contained about 50% by weight of resin.

Although the present invention has been described with particular reference to the specific details of certain embodiments thereof, it is not intended that such details shall be regarded as limitations upon the scope of the invention except insofar as included in the accompanying claims.

I claim:

1. A method which comprises enclosing a fibrous base impregnated with an excess of a polymerizable liquid in an essentially impermeable envelope provided with at least one flexible wall which possesses little or no intrinsic rigidity, pressing the flexible wall into close contact with the fibrous base with a pressure of magnitude sufficient to squeeze the base and expel laterally of the wall excess polymerizable liquid and entrapped air, reducing the pressure upon the wall and polymerizing the impregnated base.

2. A method which comprises enclosing a fibrous base impregnated with an excess of a polymerizable liquid in an essentially impermeable envelope provided with at least one flexible wall which possesses little or no intrinsic rigidity, pressing the flexible wall into close contact with the fibrous base with a pressure of magnitude sufficient to squeeze the base and expel laterally of the wall excess polymerizable liquid and entrapped air, reducing the pressure upon the wall, bending the enclosed base and the envelope to a nonplanar contour and polymerizing the impregnated base.

3. A method which comprises enclosing a fibrous base impregnated with an excess of liquid polymerizable material in an envelope of essentially nonporous flexible material possessing little or no intrinsic rigidity, applying a squeezing pressure to the envelope and the base in a direction perpendicular to the base, moving the applied pressure toward an edge of the base from an interior section thereof to squeeze excess polymerizable liquid from the fibrous base and cause such excess to flow from the interior to an edge of the base, carrying therewith entrapped air, and to force the envelope into intimate contact with the impregnated base, and polymerizing the impregnated base.

4. The process of claim 3 wherein the envelope is made of a thin foil having a thickness not in excess of about 0.05 inch.

5. The process of claim 3 wherein the envelope is made of cellophane.

6. A method which comprises enclosing a fibrous base impregnated with an excess of a polymerizable liquid having a viscosity of at least about 1000 centipoises in an essentially impermeable envelope provided with at least one flexible wall which possesses little or no intrinsic rigidity, pressing the flexible wall into close contact with the fibrous base with a pressure of magnitude sufficient to squeeze the base and expel laterally of the wall excess polymerizable liquid and entrapped air, reducing the pressure upon the wall and polymerizing the impregnated base and removing the wall.

7. A process which comprises preparing a fibrous base impregnated with a polymerizable liquid and enclosed in a flexible, essentially nonrigid, nonporous envelope provided with an opening adjacent an edge of the base, squeezing the envelope to force excess polymerizable liquid and entrapped air to an edge of the base adjacent the outlet of the envelope and to force the walls of the envelope into close contact with the base and thereby to seal the envelope at its outlet by means of the polymerizable liquid and polymerizing the liquid to a solid state while maintaining the seal.

8. A process which comprises placing a fibrous base impregnated with an excess of a polymerizable liquid between a pair of substantially nonporous cover sheets at least one of which is flexible and possesses little or no intrinsic rigidity, squeezing the cover sheets together to force the sheets into close contact with the impregnated base and to force excess polymerizable liquid and entrapped air to an edge of the base, thereby essentially forming an envelope which is essentially sealed by expelled liquid against substantial intake of air into the base, and polymerizing the base while the seal is maintained.

9. The process of claim 8 in which the flexible cover sheet is cellophane.

10. A method which comprises placing a fibrous base impregnated with an excess of a polymerizable liquid between a pair of essentially nonporous cover sheets at least one of which is flexible, and possesses little or no intrinsic rigidity, the sheets overlapping the base adjacent a pair of opposed edges thereof, squeezing the cover sheets together to force the sheets into close contact with the base and to force excess polymerizable liquid and entrapped air between the cover sheets to a zone adjacent the edges of the base, whereby to cause the covers to adhere and by means of the excess liquid to essentially seal the assemblage against substantial intake of air into the base, and polymerizing the base while the seal is maintained.

11. A method which comprises enclosing a fibrous base impregnated with a liquid polymerizable material between a pair of nonporous cover sheets at least one of which is a flexible sheet possessing little or no intrinsic rigidity, including as a step in effecting such enclosure the application of said flexible sheet to complete the enclosure by placing the end of said flexible sheet upon the base, and squeezing the cover sheets together and moving the squeezing pressure toward an opposite edge of the base, whereby the flexible sheet is gradually applied and the sheets are simultaneously squeezed at the point of application, maintaining the squeezing pressure sufficiently high to squeeze out the excess polymerizable liquid and thereby to expel entrapped air and minimize inclusion of air and thus by means of the excess liquid to essentially seal a substantial portion of the base from substantial intake of air, and polymerizing the sealed base.

12. A method which comprises preparing a fibrous sheet impregnated with a liquid polymerizable material and provided with a nonporous cover sheet upon one side thereof, applying a sheet of cellophane possessing little or no intrinsic rigidity to the opposite side of the fibrous sheet, applying a squeezing pressure to squeeze the cover sheets together at an interior portion of the fibrous sheet, the pressure being of sufficient magnitude to squeeze out the excess polymerizable liquid and entrapped air, moving the pressure toward an edge of the fibrous sheet, thereby forcing such excess liquid and entrapped air in front of the point of the applied pressure and eventually to the edge of the fibrous sheet to form a seal adjacent such edge against substantial intake of air, and polymerizing the liquid while the seal is maintained.

13. A method which comprises establishing a fibrous base impregnated with a liquid polymerizable material between a pair of cellophane sheets possessing little or no intrinsic rigidity, squeezing the sheets to force excess liquid and entrapped air to the edge of the fibrous base, whereby the excess liquid forms a seal minimizing substantial intake of air between the sheets, and polymerizing the liquid while the seal is maintained.

14. A method which comprises establishing a laminated fibrous sheet impregnated with a liquid polymerizable material between a pair of nonporous flexible cover sheets having a thickness not over about 0.05 inch, pressing the sheets together to squeeze out excess polymerizable liquid and sweep entrapped air to a point adjacent the edges of the fibrous sheet and to force the cover sheets into close contact with the fibrous sheet whereby substantial intake of air between the sheet, is prevented and polymerizing the fibrous sheet.

15. The process of claim 14 wherein the cover sheets are larger than the fibrous sheet and overlap the sheet, whereby the expelled polymerizable liquid holds the edges of the sheets together and forms a sealed envelope.

16. A process which comprises placing a fibrous base impregnated with an excess of a polymerizable liquid between a pair of substantially nonporous cover sheets at least one of which is flexible and possesses little or no intrinsic rigidity, squeezing the cover sheets together to force the sheets into close contact with the impregnated base and to force excess polymerizable liquid and entrapped air to an edge of the base, thereby essentially forming an envelope which is essentially sealed by expelled liquid against substantial intake of air into the base, discontinuing the said squeezing action and polymerizing the sealed base.

IRVING E. MUSKAT.

REFERENCES CITED

The following references are of record in the file of this patent:

UNITED STATES PATENTS

| Number | Name | Date |
| --- | --- | --- |
| 1,206,656 | Benedictus | Nov. 28, 1910 |
| 1,899,591 | Segar | Feb. 28, 1933 |
| 2,276,004 | Vidal | Mar. 10, 1942 |
| 2,311,518 | Caligari | Feb. 16, 1943 |
| 2,343,225 | Pray et al. | Feb. 29, 1944 |
| 2,397,827 | Williams | Apr. 2, 1946 |
| 2,456,093 | Swedlow | Dec. 14, 1948 |
| 2,496,911 | Green | Feb. 7, 1950 |

FOREIGN PATENTS

| Number | Country | Date |
| --- | --- | --- |
| 116,514 | Australia | Jan. 29, 1943 |

OTHER REFERENCES

Plastics Bulletin No. 2, Columbia Chemical Div., August 1942, pages 4 and 5.